(12) United States Patent
Sato et al.

(10) Patent No.: US 7,050,204 B1
(45) Date of Patent: May 23, 2006

(54) OPTICAL READING APPARATUS AND IMAGE FORMING APPARATUS

(75) Inventors: Tsutomu Sato, Shizuoka (JP); Ryusuke Yamaguchi, Shizuoka (JP); Yusuke Hashizume, Tokyo (JP); Kazuyoshi Tsutsumi, Kanagawa (JP); Yutaka Hayano, Kanagawa (JP); Hiroshi Maejima, Yamanashi (JP); Junya Ozawa, Yamanashi (JP)

(73) Assignees: Nisca Corporation, Yamanashi (JP); Toshiba Tec Kabushiki Kaisha, Tokyo (JP)

(*) Notice: Subject to any disclaimer, the term of this patent is extended or adjusted under 35 U.S.C. 154(b) by 854 days.

(21) Appl. No.: 09/704,667

(22) Filed: Nov. 3, 2000

(30) Foreign Application Priority Data

Nov. 4, 1999 (JP) ............................. 11-314458

(51) Int. Cl.
*H04N 1/40* (2006.01)

(52) U.S. Cl. .................. 358/471; 358/474; 399/405
(58) Field of Classification Search ........... 358/471, 358/474, 448, 486, 505, 513; 399/405
See application file for complete search history.

(56) References Cited

U.S. PATENT DOCUMENTS

| | | | |
|---|---|---|---|
| 5,136,151 A | | 8/1992 | Kobayashi .............. 250/208 |
| 5,724,641 A | * | 3/1998 | Yoshihiro et al. ......... 399/410 |
| 5,734,758 A | | 3/1998 | Yamamoto et al. ........ 382/274 |
| 5,920,758 A | * | 7/1999 | Ohtsuki .................. 399/405 |
| 5,953,135 A | * | 9/1999 | Tomoe et al. ............ 358/498 |
| 6,314,267 B1 | * | 11/2001 | Kida ........................ 399/405 |

FOREIGN PATENT DOCUMENTS

| | | |
|---|---|---|
| DE | 298 14 558 U 1 | 10/1998 |
| EP | 0 905 969 A2 | 3/1999 |
| JP | 02-248973 | 10/1990 |
| JP | 06-313999 | 11/1994 |

OTHER PUBLICATIONS

European Search Report dated Aug. 29, 2002.

* cited by examiner

*Primary Examiner*—Mark Wallerson
*Assistant Examiner*—Negussie Worku
(74) *Attorney, Agent, or Firm*—Westerman, Hattori, Daniels & Adrian, LLP (57) ABSTRACT

An optical reading apparatus and a multifunction-type image forming apparatus, with a minimized thickness in a cabinet height direction and a housing shaped along an upper shape of discharge tray of the image forming apparatus provided thereunder. The optical reading apparatus comprises: platen glass defined with one end and the other end, on an upper surface of which an original document is placed; an optical reading unit that translates between the both ends on a lower surface of the platen glass, for obtaining image data by irradiating an original document surface with light through the platen glass; a control circuit board connected to the optical reading unit, for processing an electric signal; and a housing wherein a side on the side of the other end is thicker than a side on the side of the one end. The image forming apparatus has a cabinet containing: sheet discharge unit for discharging an image formation sheet from a lower-part lower-side on the thicker side of the housing of the optical reading apparatus toward a lower-part upper side on the thinner side of the housing; and a discharge tray on which the image formation sheet discharged from the sheet discharge unit is received and stacked.

13 Claims, 13 Drawing Sheets

OPTICAL READING APPARATUS AND IMAGE FORMING APPARATUS

BACKGROUND OF THE INVENTION

Field of the Invention

The present invention relates to an optical reading apparatus for reading an original document surface by optically scanning, and an image forming apparatus, carrying the optical reading apparatus thereon, with a printing function to receive print data from an electronic copying function and the outside, and the like.

With rapid development of recent electronic technologies and optical technologies, high-quality, multifunction and downsized optical reading apparatuses and image forming apparatuses have been provided.

In the optical reading apparatus, a scanning pitch has become more fine to optically read an original document surface precisely. As photoelectric conversion means for converting an optically read signal into an electric signal, a high resolution CCD sensor having more pixels is used. Further, the image forming apparatus (copying machine) carrying the optical reading apparatus has a facsimile function and a printer function to receive print data from an external data processing device such as a personal computer in addition to a copying function. Further, a function to transmit image data obtained by the optical reading apparatus to the data processing device such as a personal computer is required. As one image forming apparatus has these four functions, rationalization and downsizing of clerical work space is attained.

Figure 1:
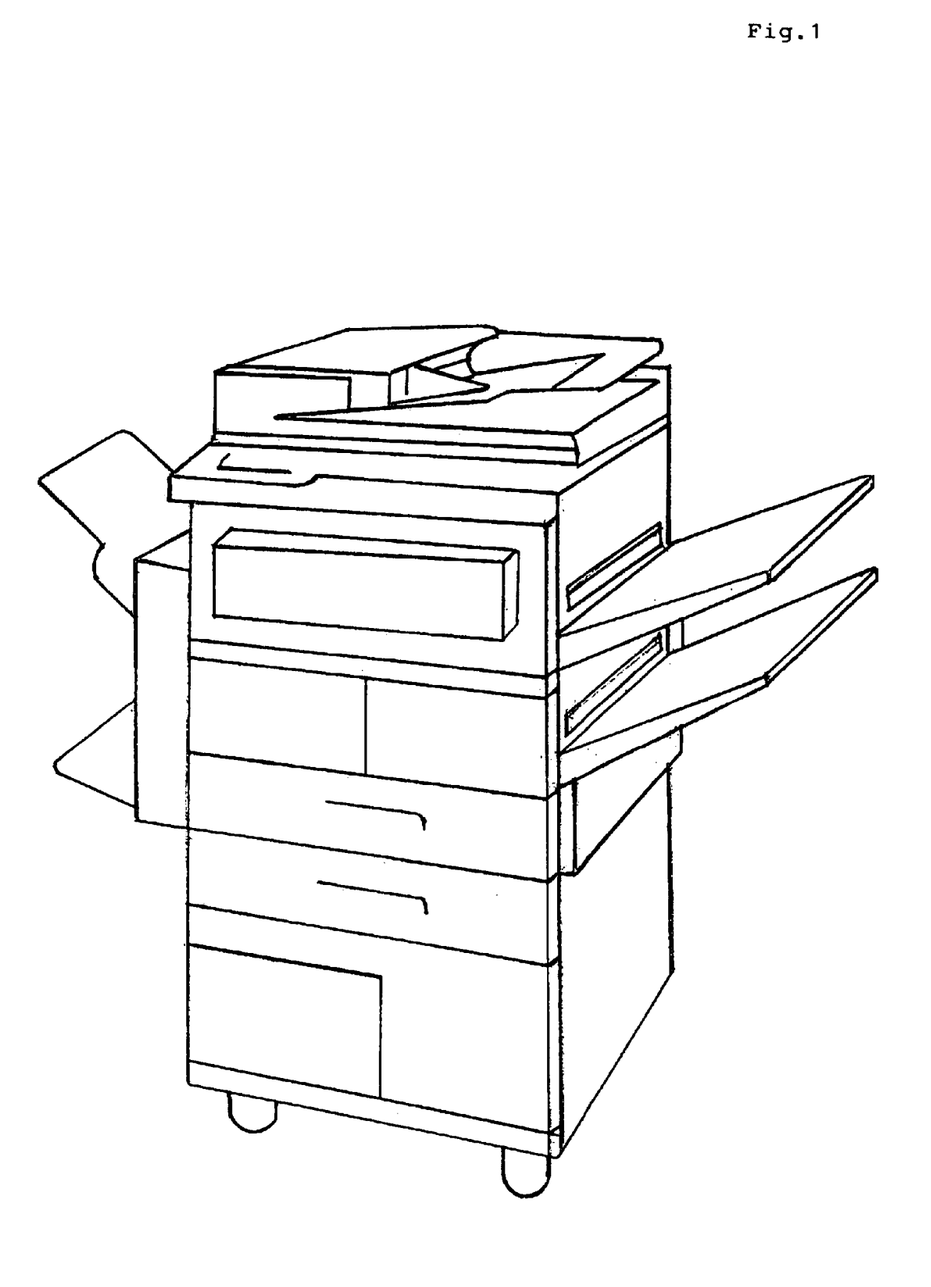
FIG. 1 illustrates a first example of the outer appearance of the conventional image forming apparatus in which the discharge tray is provided outside the cabinet.

FIG. 1 shows a first example of the outer appearance of general conventional image forming apparatus having plural. The conventional image forming apparatus shown in FIG. 1 has paper trays for independently storing plural sizes of print sheets in a lower part of the cabinet, thus reducing the floor space. However, as discharge trays for holding discharged print sheets after image formation are protruded outward from the side surface side, the substantial floor space necessary for installation of the apparatus includes the discharge trays protruded outward from the side surface side.

Figure 2:
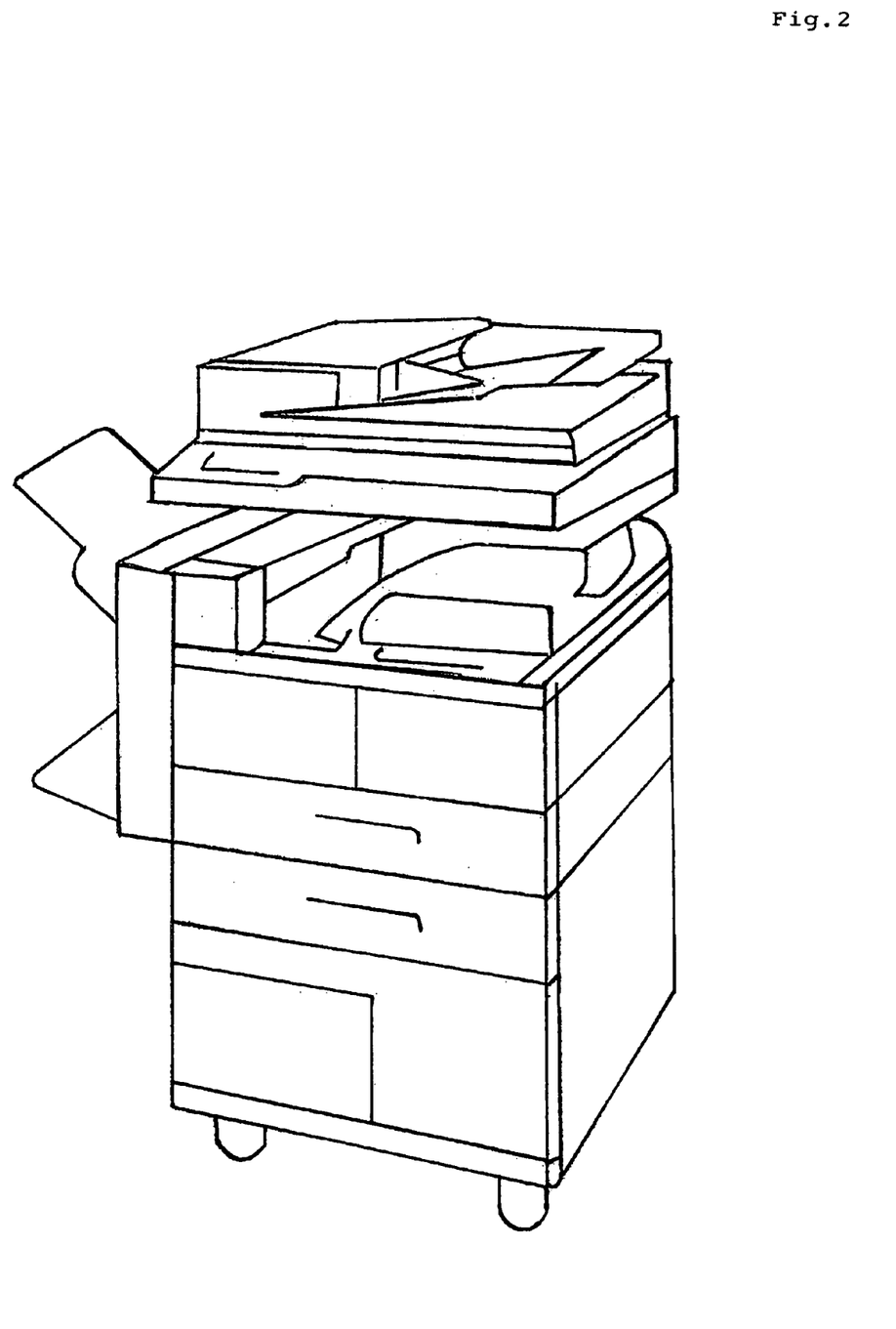
FIG. 2 illustrates a second example of the outer appearance of the conventional image forming apparatus in which the discharge tray is provided inside the cabinet.

FIG. 2 shows the outer appearance of "ABLE 3250" by Fuji Zerox Co., Ltd. To solve the above problem, the discharge tray is provided between a position under the housing of optical reading apparatus and a cabinet upper portion containing an image forming unit. In the image forming apparatus of this conventional art, as the discharge tray for storing print sheets after image formation is provided within the size of the cabinet without being protruded outward from the side surface side, the substantial floor space is greatly reduced.

Figure 3:
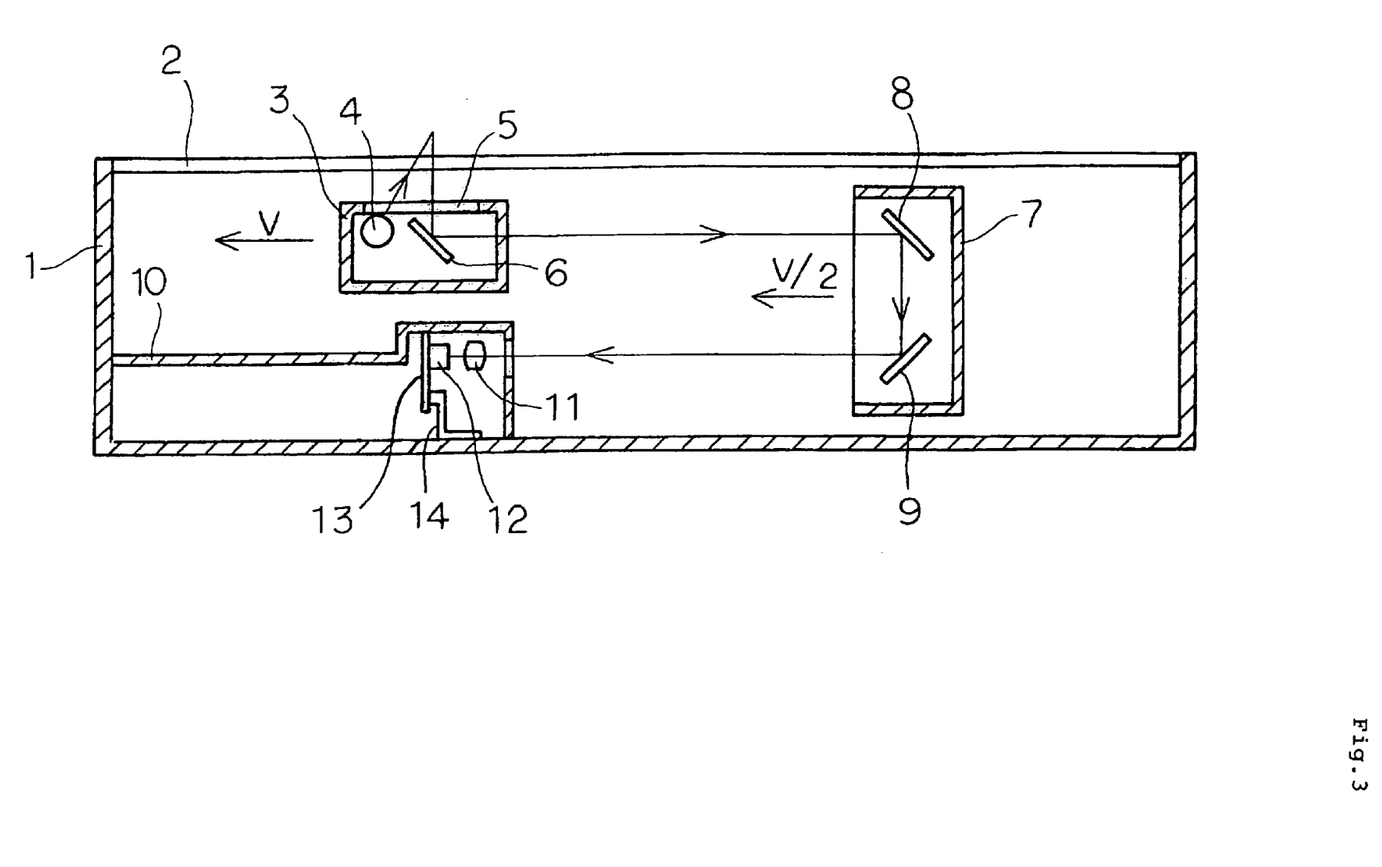
FIG. 3 is a lateral cross-sectional view of the conventional optical reading apparatus in FIG. 2.
Figure 4:
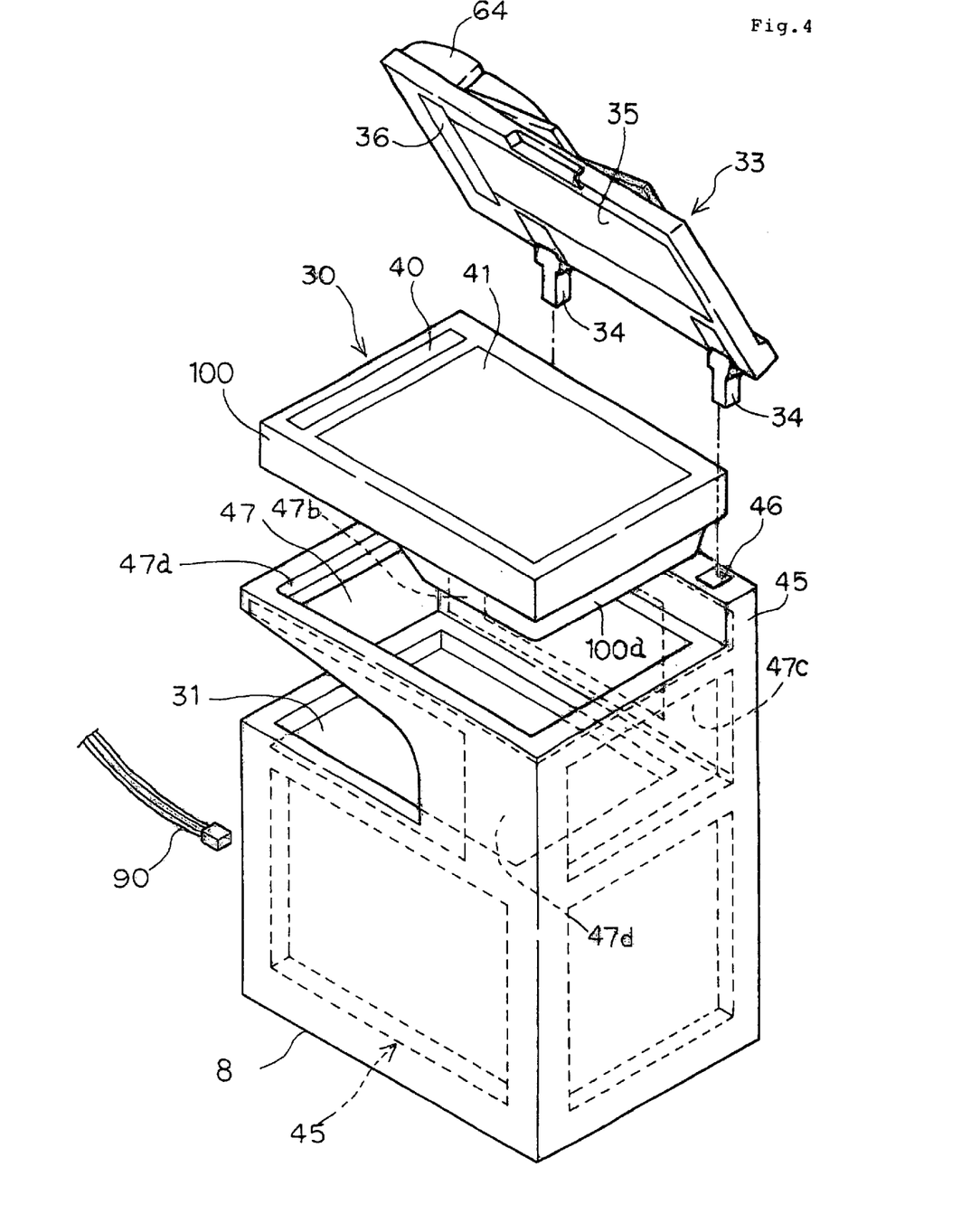
FIG. 4 is a perspective view of the outer appearance of an image forming apparatus carrying an optical reading apparatus according to the present invention.

FIG. 3 is a cross-sectional view of the optical reading apparatus of the conventional art in FIG. 2. An original document is placed on a platen glass 2 attached onto a chassis 1, and a first carriage 3 and a second carriage 7 in cooperation with each other project an image on the original document onto a photoelectric converting device (hereinbelow CCD) 12.

The placed original document is irradiated by a light source 4 provided in the first carriage 3. The diffused light of the emitted light passes through an opening 5 of the first carriage 3, and a first mirror 6 changes the optical path in a subscanning direction (direction of the original document movement). The optical-path changed image on the original document is changed downward by a second mirror 8 of the second carriage 7, and changed toward a lens 11 by a third mirror 9. The image light-gathered by the lens 11 is emitted on the CCD (photoelectric conversion device in the claims) 12 on a CCD board 13 fixed to the chassis 1 with an angle member 14. Note that in the present invention, the CCD is used as representative of the photoelectric conversion device, however, amorphous or MOS type photoelectric conversion device may be used.

The image converted by the CCD 12 into an electric signal is processed by an image processing circuit on a CCD board 13 and a control board (not shown) in the housing of the optical reading apparatus. The lens 11, the CCD board 13 and the control board are covered with a shielding plate 10 preventing entrance of unnecessarily diffused light from the light source 4.

The first carriage is subscanned at a speed twice faster than that of the second carriage such that the length of optical path from the original document surface through the three mirrors to the lens is always a fixed length.

Although not shown in the figure, the first carriage and the second carriage are supported by respectively different surfaces of guide rails. Further, a document scanning initial position of the first carriage and the second carriage is positioned at the right end of the platen glass 2, and the first carriage scans above the shielding plate 10 around the end of the subscanning. Accordingly, the thickness of the housing of the optical reading apparatus must be equal to or greater than the total amount of the thickness of the shielding plate and the thickness to the first carriage. Thus the thickness of the housing is limited by this amount. Further, space for holding the control board must be ensured in the housing.

In this manner, plural paper trays for various paper sizes are stacked in the lower part of the cabinet of the image forming apparatus, and the discharge tray is provided on an upper part of the cabinet. Further, as space for manual operation to pick up a sheet on the discharge tray is required above the discharge tray, the size of the cabinet of the image forming apparatus is large in height, and the optical reading apparatus set on the cabinet is provided in a very high position. Further, in many cases, an automatic document feeder (ADF) to pick up plural documents on the tray one by one and send them to the optical reading apparatus is also used. Thus, from the point of improvement in operability, it has been an important problem in the conventional image forming apparatus to reduce the height of the multifunction image formation apparatus.

SUMMARY OF THE INVENTION

Accordingly, the present invention provides an image forming apparatus carrying an optical reading apparatus thereon, wherein the entire thickness of the image forming apparatus in its height direction is reduced to a minimum, a cabinet thereof is constructed so as to be matched to an upper surface shape of a discharge tray for receiving and stacking image formation sheets discharged from one side-surface lower side to the other side-surface upper side. The optical reading apparatus comprises: platen glass defined with one end and the other end, on an upper surface of which an original document is placed; an optical reading unit that translates between the both ends on a lower surface of the platen glass, for obtaining image data by irradiating an original document surface with light through the platen glass; a control circuit board connected to the optical reading unit, for processing an electric signal; and a housing wherein a side on the side of the other end is thicker than a side on the side of the one end, and wherein the image forming apparatus having a cabinet containing: sheet discharge means for discharging an image formation sheet from a lower-part lower-side on the thicker side of the housing of the optical reading apparatus toward a lower-part upper side on the thinner side of the housing; and a discharge tray on which the image formation sheet discharged from the sheet discharge means is received and stacked. The control circuit board is provided in a position lower than running movement space of the moving optical reading unit.

The optical reading unit may not be the integrated carriage type optical reader but two-carriage type optical reader. In this case, the optical reading unit has two carriages, a first carriage which carries light source means for irradiating an original document with light and scans the light source means, and a second carriage which carries optical path means for guiding reflected light to the photoelectric conversion means and which moves at a speed half of that of the first carriage.

The present invention further provides an image forming apparatus carrying an optical reading apparatus thereon, wherein the optical reading apparatus comprising: platen glass defined with one end and the other end, on an upper surface of which an original document is placed; light source means translating between the both ends on a lower surface of the platen glass, for irradiating an original document surface with light through the platen glass; photoelectric conversion means for receiving reflection light from the original document and converting it into an electric signal; a optical path means for guiding the reflection light to the photoelectric conversion means; a control circuit board connected to the photoelectric conversion means, for processing an electric signal; and a housing wherein a side on the side of the other end is thicker than a side on the side of the one end, and wherein the image forming apparatus having a cabinet containing: sheet discharge means for discharging an image formation sheet from a lower-part lower-side on the thicker side of the housing of the optical reading apparatus toward a lower-part upper side on the thinner side of the housing; and a discharge tray on which the image formation sheet discharged from the sheet discharge means is received and stacked. If the optical reading unit is an integrated type optical reader, the light source means has a first carriage for running the light source means and a second carriage that runs at a speed half of that of the first carriage. If the optical reading unit is two-carriage type optical reader, the control circuit board is provided at an equal height of or at a position lower than the photoelectric conversion means.

the optical reading apparatus further comprising shield means, surrounding the photoelectric conversion means and the control circuit board, for preventing entrance of leakage light inside and outside the apparatus and electric noise and preventing electromagnetic wave interference including diffusion of radiation noise.

Further, in the optical reading apparatus, drive mechanism means including a drive motor is provided on the other end side rather than the center of the platen glass on a back side opposite to an operation front side of the apparatus, the platen glass in the housing means is moved to the operation front side of the apparatus.

By this construction, the housing means of the optical reading apparatus is formed such that the thickness of lower part on the one end side is thinner than that of the lower part on the other end side. The image data is read from the original document from the one end side of the platen glass toward the other end side.

DESCRIPTION OF THE PREFERRED EMBODIMENTS

Hereinbelow, the details of optical reading apparatus (hereinafter referred to as a "scanner") and image forming apparatus carrying the scanner will be described with reference to the drawings.

FIGS. 4 to 11 illustrate the outer appearance and cross sections of respective parts of the optical reading apparatus (scanner) and the image forming apparatus (printer system) according to the present invention, comprising a first paper cassette 32a, a second paper cassette 32b, a printer 31, a scanner 30, and an ADF 33.

The printer system carrying the scanner according to the present invention can be utilized as a digital copying machine, and further, since the scanner 30 and the printer 31 can be independently utilized by connection with a network cable 90, these apparatuses also have the following respective functions as a network printer and a network scanner.

(1) Printer Mechanism

New print sheets before printing are stored in the cassettes 32a and 32b. Although not shown in the figures, the print sheets are stored in a lower part of space 60 inside the printer. These cassettes are selectively used in accordance with size and type of print sheets. The cassette 32a for example will be described.

Figure 5:
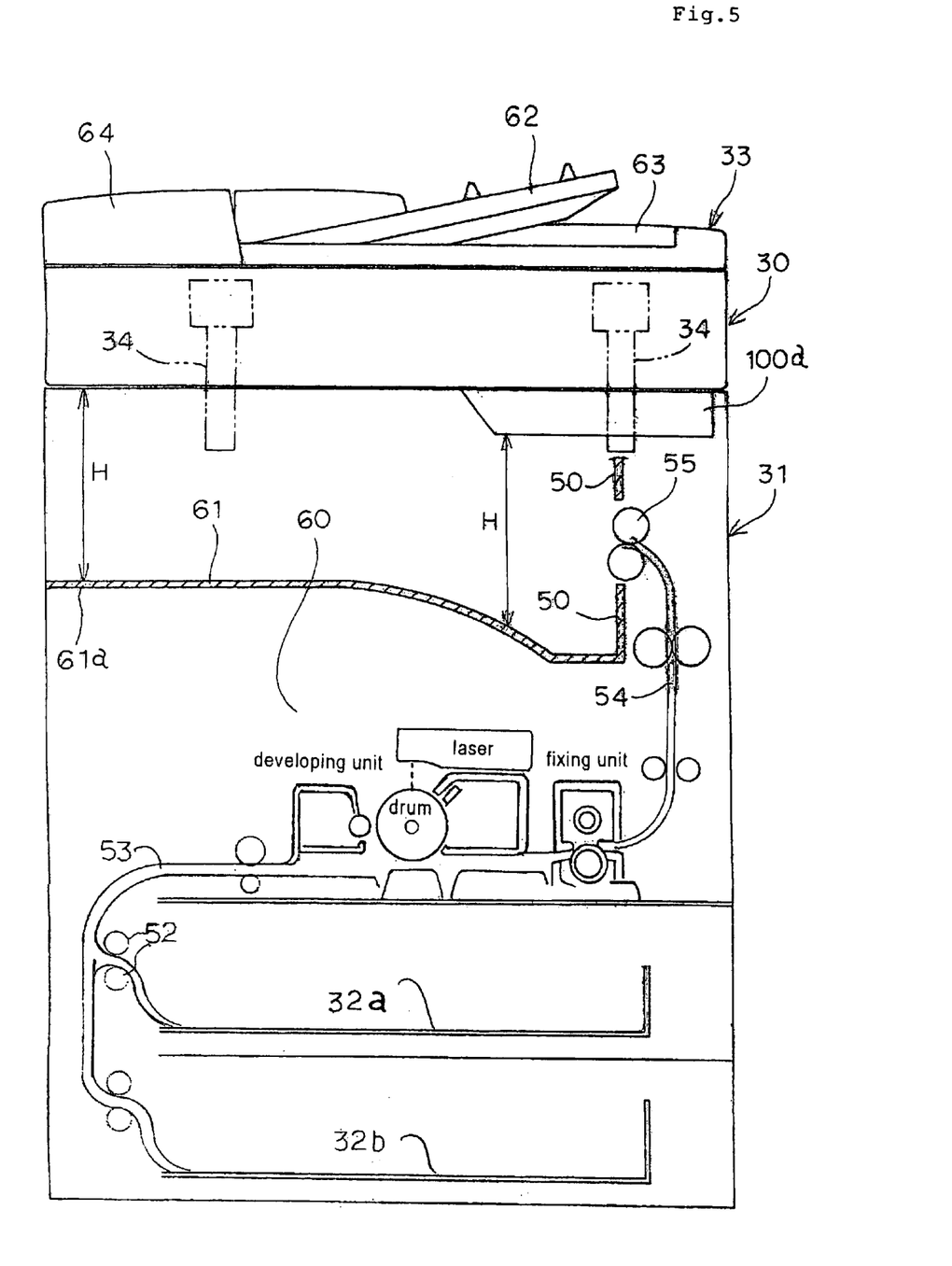
FIG. 5 is a lateral cross-sectional view of the image forming apparatus in FIG. 4.

Print sheets stacked on the cassette 32a are fed by a pickup mechanism and sent by a feed roller 52, via a conveyance path 53, to a printing engine. As shown in the figures, the printing engine comprises respective principal constituent modules, a developer, a laser device, a drum and a fixer. A sheet on which image formation has been made by the printing engine is discharged by a discharge roller 55 through a conveyance path 54 onto a printer tray 61.

(2) Sink Portion

The printer 61 has a slope to improve alignment and orientation of discharged sheets. By this slope, the thickness of sink portion 100*a* formed in a chassis 100 of the scanner above the sheet stack is not an obstacle in space where an operator finally reaches to pick up a print out. The depth of the sink portion 100*a* is set to be approximately equal to a height H from a rear end 61*a* of the printer tray 61 in a position opposite to a vertical surface 50 at a discharge portion of the printer tray 61 to the bottom surface of the chasses 100 of the scanner 30.

(3) Frame Structure

A frame 45 is covered with a mold jacket 80. However, to set the scanner 30 on the printer 31 and further set the ADF 33 thereon, the frame as a sturdy structure supports the weight of almost all these elements.

The first cassette 32*a* and the second cassette 32*b* containing print sheets before printing, and the printer 31 are placed in a base (lower) part of the frame 45. As the weight of these elements is over the bottom surface of the frame 45, the elements greatly distribute to lower the center of gravity. The frame 45 has a shape to support the outside shape of the chassis 100 of the scanner 30 such that the scanner 30 is placed on the printer 31.

(4) Features of Scanner

In the frame 45, a peripheral frame 47*a* is supported by struts 47*b* to 47*d*. Accordingly, the frame 45 is supported on three points. The frame 45 has holes 46 into which hinges 34 to support the ADF are inserted. Thus, the ADF 33 is supported not by the scanner 30 but by the frame 45.

This structure depends on the characteristic of the scanner 30. When the chassis 100 of the scanner 30 receives torsional moment, guide rails 101*a* and 101*b* supporting the carriage connected to the chassis 100 cannot be kept parallel, and the two carriages running on them cannot maintain a predetermined relation. As a result, light from an original document cannot be sufficiently incident on the photoelectric conversion system, and image degradation is caused, and further, occasionally, an image cannot be obtained.

For this reason, in the scanner 30, the chassis 100 must be uniformly supported, and an arrangement not to apply a heavy load on a part thereof is required. Generally, in a scanner installed on a floor as a computer terminal, the bottom surface of the chassis can be uniformly received by arrangement of the feet. However, in the present structure to support the chassis by the peripheral frame 47*a*, unbalanced weighting is avoided as much as possible. In this point, it is very important to support the ADF 33 not by the scanner 30 but by the frame 45. Note that the upper surface of the scanner 30 has two reading surfaces.

Next, ADF platen glass 40 and book platen glass 41 will be described. The ADF platen glass 40 is window glass to obtain an original document image from an original document, separated and conveyed one by one from documents stacked on an original feed tray 62 of the ADF 33, by a separation conveyance unit 64, through an opening 36. The book platen glass 41 is window glass where the original document is fixedly set and original document reading is performed.

(5) Operation of Scanner

Figure 6:
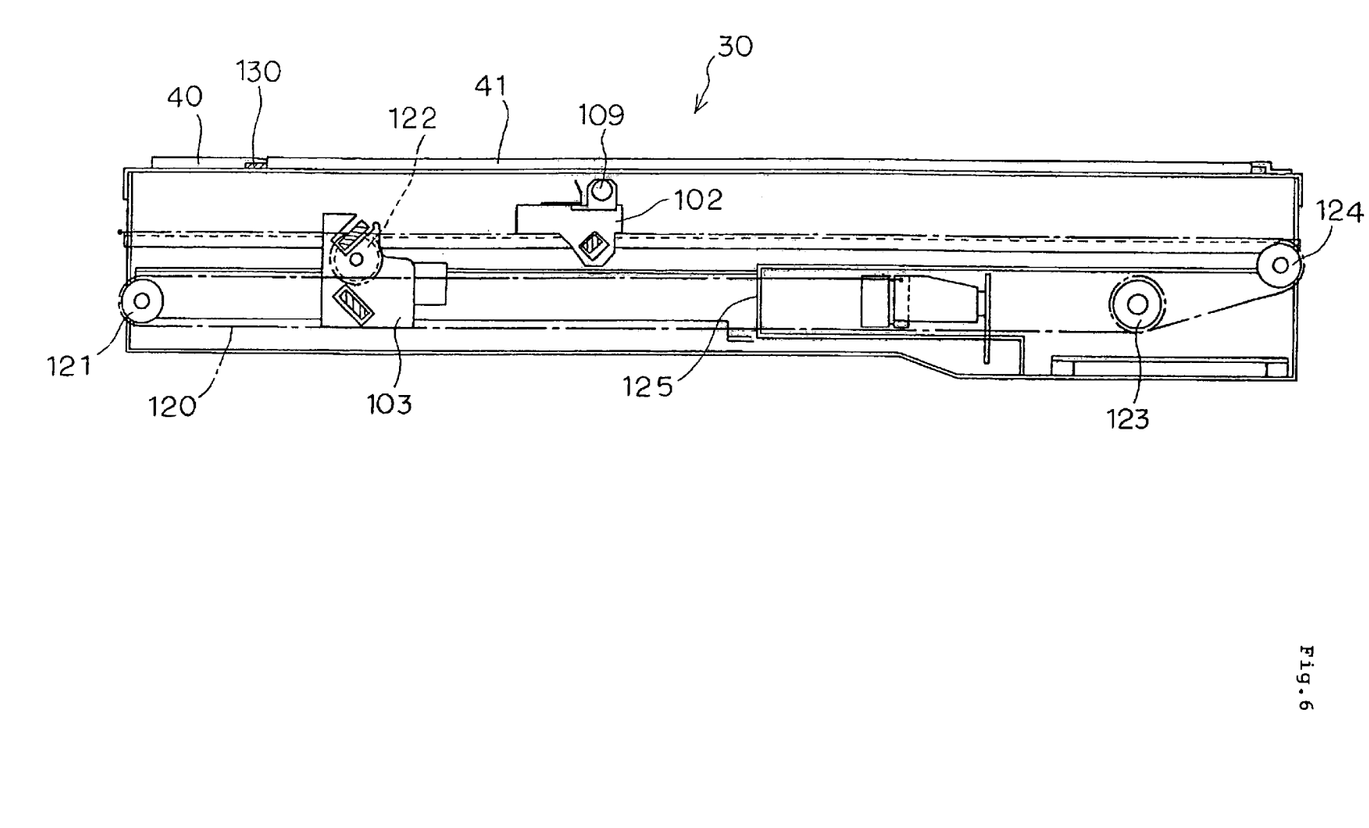
FIG. 6 is a lateral cross-sectional view of the optical reading apparatus according to the present invention.

The original document image is inputted as light into a CCD 105 via a lens 104 as a photoelectric conversion device, by a first carriage 102 and a second carriage 103 subscanned on a guide rail 101. The guide rail 101 includes two pairs of guide rails, upper guide rail 101*a* and lower guide rail 101*c* and upper guide rail 10*b* and lower guide rail 101*d*. The both ends of the first carriage 102 and the second carriage 103 are supported by surfaces of the respective corresponding guide rails.

Figure 13:
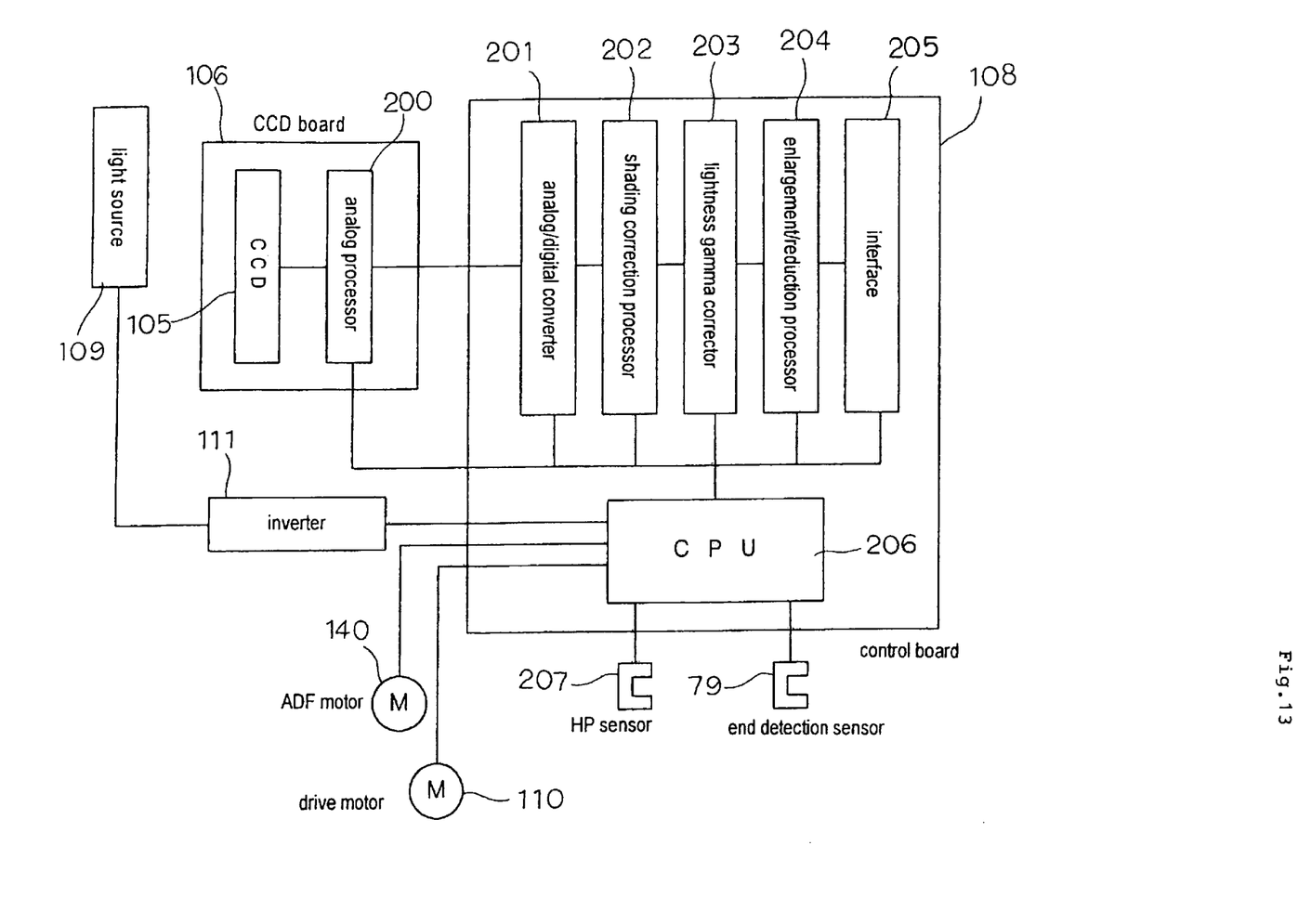
FIG. 13 is a block diagram of the control circuit of the optical reading apparatus according to the present invention.

An image signal, converted as an electric signal by the CCD 105 on a CCD board 106, is optimized by an analog processor 200 and forwarded as an analog signal via a connection cable 107 to a control board 108.

In the CCD 105, several thousands of photoelectric conversion chips are one-dimensionally arrayed. The direction along the array is the main scanning direction, and a direction orthogonal to the main scanning direction is the subscanning direction in which the first carriage 102 and the second carriage 103 move.

The control board 108 has circuit blocks such as an analog/digital converter 201, a shading correction processor 202 which corrects optical distortion and the like in the main scanning direction, a lightness gamma corrector 203 which performs gamma correction as curve correction on image lightness and light and shade of image, or an enlargement/reduction processor for processing image resolution, and an I/F 205 for data transfer to the printer 301. They are generally known digital processings and therefore the explanations of these processings will be omitted.

In the embodiment, the I/F 205 is in conformance to particular specifications for the printer 31. As the image data obtained by scanning the carriages is transferred to the printer 31 at a high speed without any delay of image-data acquisition speed, the carriages do not stop during the reading.

In the present embodiment, the reading without stoppage in this manner is realized since the scanner is designed for the particular printer, however, generally, many scanners have a buffer memory for storing image to a certain amount, and read the entire original document by performing carriage scanning and temporary stoppage of reading operation. These scanners have a CPU 206 for setting these processings and timing control or monitoring statuses. The CPU 206 controls a drive motor 110 to drive the first carriage 102 and the second carriage 103 with a wire 120, and monitors an HP sensor for carriage original-position detection. Further, the CPU controls an inverter power source 111 to turn on/off a light source 109 to irradiate the original document. Further, the scanners actually have several memories such as a program memory, a work memory and an image processing memory, a clock control circuit and the like, however, as they are general constituent elements, the illustration and explanation of these elements will be omitted.

Note that in the above description, the analog elements are mounted on the CCD board 106, however, in some cases, the analog/digital converter 201 may be also mounted on the CCD board, or only a follower transistor to receive output from the CCD 105 or the like is mounted on the CCD board. Accordingly, regarding the board arrangement as a part of the present invention, as definitions of various circuit division such as defining two substrates or dividing the board into three separate boards may be made, the invention includes all such definitions.

(6) Operation of Carriage (Reading by ADF Sheet Feeding)

Figure 12:
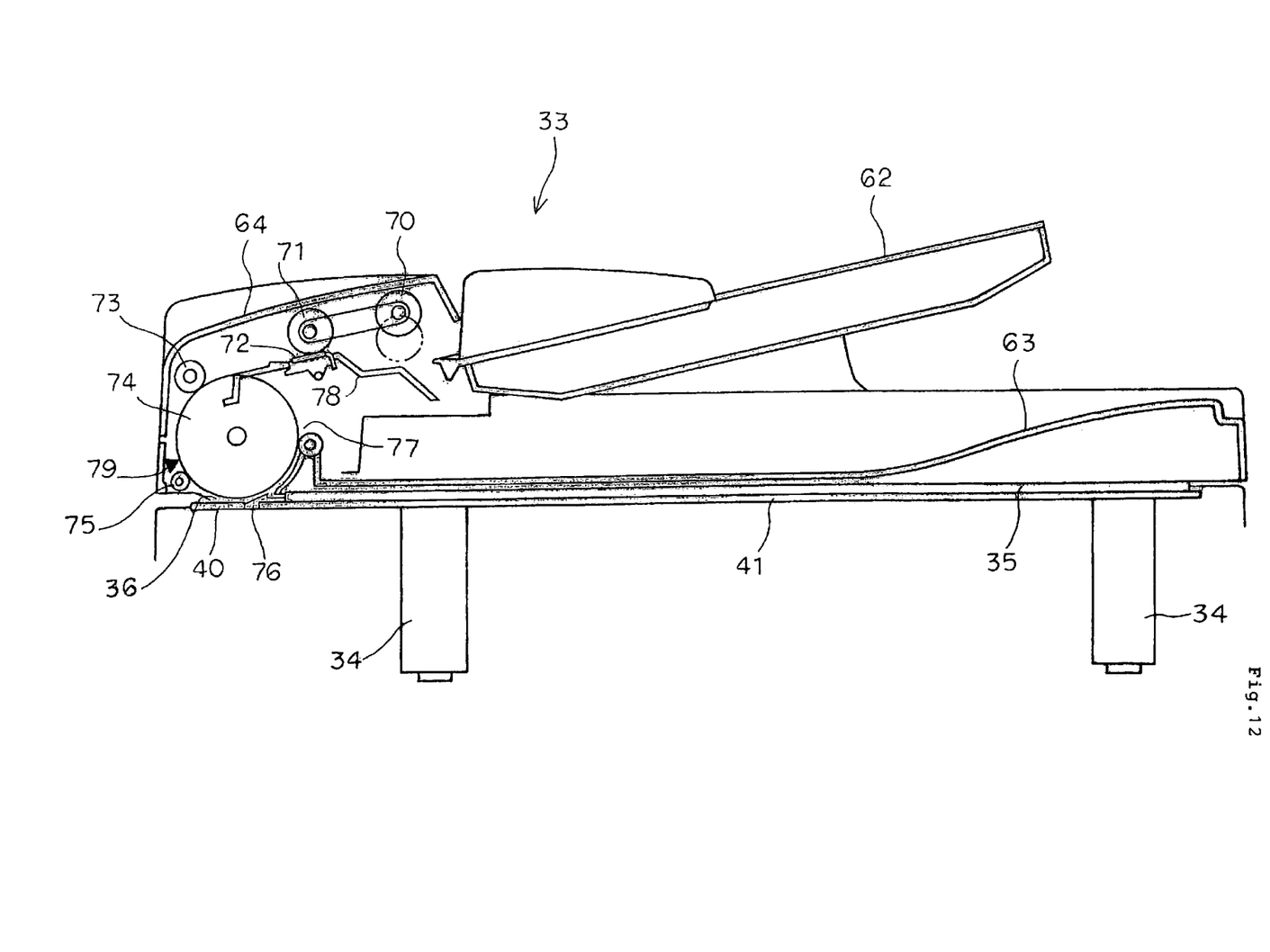
FIG. 12 is a lateral cross-sectional view of automatic document reading device.

Next, the ADF 33 will be briefly described. In the ADF 33, the separation conveyance unit 64 is briefly divides into a separator to separate stacked original documents into respective one-sheet documents and a conveyer to convey the separated original document, through the opening 36 positioned above the reading window 40 for reading on the scanner 30 side, onto a discharge tray 63. In an initial state, a paper feed roller 70 for paper feeding is withdrawn in an upper position, and a stack of documents is placed in space between the roller and a paper feed guide 78. The end of the document stack is defined by a vertical surface of the paper feed guide 78, and only an upper portion of the stack is fed to a separation roller 71. A rubber separation pad 72 is provided below the separation roller 71, and from the relation between a braking force received from the separation pad 72 and a conveyance force of the separation roller 71, only one sheet is separated, and sent between a convey rods 73 and 75 and a large roller 74. Then the scanner 30 starts acquisition of original document image based on a signal obtained by an end detection sensor 79. The original document is guided by a pickup unit 76 to a discharge unit 77, and finally discharged onto the discharge tray 63.

Although not shown in the figures, the CPU 206 in the control board 108 of the scanner 30 controls rotation of ADF motor 140. Further, the signal from the end detection sensor 79 is supplied to the CPU 206.

Next, the reading in case of sheet feeding by the ADF will be described.

A white plate 130 is provided on the border between the ADF platen glass 40 and the book platen glass 41, and by referring to the white plate 130, reference data for shading correction is obtained to correct optical distortion caused in the main scanning direction of the optical system of the scanner 30. The method of shading correction is performed by dividing the obtained original document image data by the above reference data for each CCD pixel.

When the first carriage 102 is positioned below the white plate 130, a signal from an HP sensor 207 changes. Accordingly, the first carriage 102 and the second carriage 103 stand by in this standby position below the white plate 130. When a reading start command has come from the printer 31, the scanner 30 obtains data of the white plate without turning on the light source 109. The obtained data is called black data, used for cancellation of white noise caused in the analog circuits, an offset level for each pixel of the CCD 105, temperature drift, and time variation and the like. The shading correction is performed by calculating difference from the reference data and also calculating difference from the obtained image data. Actually, calculation is performed as correction result=(input image data−black data)/(reference data−black data).

When the acquisition of black data has been completed, the light source 109 is turned on by the inverter 111, and the reference data from the white plate is read after a stabilizing period.

When the acquisition of reference data has been completed, the light source 109 of the first carriage moves to a position to irradiate the original document through the ADF platen glass 40. The drive motor 110 is a stepping motor which obtains a predetermined movement distance by receiving drive of predetermined number of pulses.

When all the initial movement processings have been completed, an original document feeding start command is sent from the scanner 30 to the ADF 33. When all the document feed and image acquisition have been completed, the carriages move to a position below the white plate 130, and stop in a standby state.

The CCD 105 performs image acquisition by repeating 1-line scanning in a lengthwise direction of the original document. While the original document is fed by the large roller 74 of the ADF 33, read image is inputted via the ADF platen glass 40, after optical path changing by a series of mirrors, and through a lens, into the CCD 105. The CCD 105 performs main scanning at a constant speed. More particularly, an electric signal is obtained by bucket-relaying electric charge accustomed in the photoelectric conversion chip constructing each pixel by supplying a clock to a shift register. Accordingly, as an analog signal is serially obtained from the CCD 105, the signal is shaped to an appropriate signal level by utilizing an amplifier or the like, and supplied to an A/D converter. As a conversion timing clock to the A/D converter is synchronized with the shift register clock to the CCD 105, the analog value of each pixel is obtained as a digital value. The digital value is subjected to predetermined processing and sent from the interface to the printer 31.

When the rear end of the original document sent at the constant speed has caused change in the signal from the end detection sensor 79, the predetermined number of step ADF motors 140 are driven so as to move a large roller 75. Then the acquisition operation of the CCD 105 is completed and the reading is ended.

(7) Operation of Carriage (Reading by Fixedly Placing Original Document)

An original document not to be damaged, such as a book or a non-separable booklet is fixedly placed and scanned. The book platen glass 41 is tempered glass having strength not to be distorted upon reception of pressure from above to a certain level. When an operator has placed the original document on the book platen glass 41, the ADF 33 is closed on the original document, and the document is pressed by a pressing plate 35. The pressing plate is used for the purpose of applying pressure to flatten the document even having wrinkle or bend. If the distance from the upper surface of the book platen glass 41 to the original document surface is long, the light from the light source 109 does not reach the document and a dark image is obtained, otherwise, as the distance from the lens 104 is long, predetermined focus cannot be attained and a blur image is obtained.

Generally, in an idle state where reading is not performed, when the scanner 30 receives the reading start command from the printer 31, the scanner obtains the black data and the reference data as in the case of the operation of the ADF. Thereafter, a predetermined pulse is sent to the drive motor 110 to move the first carriage 102 to a placement guide (not shown) as a reference placement position for the original document provided on an end surface of the book platen glass 41.

Figure 7:
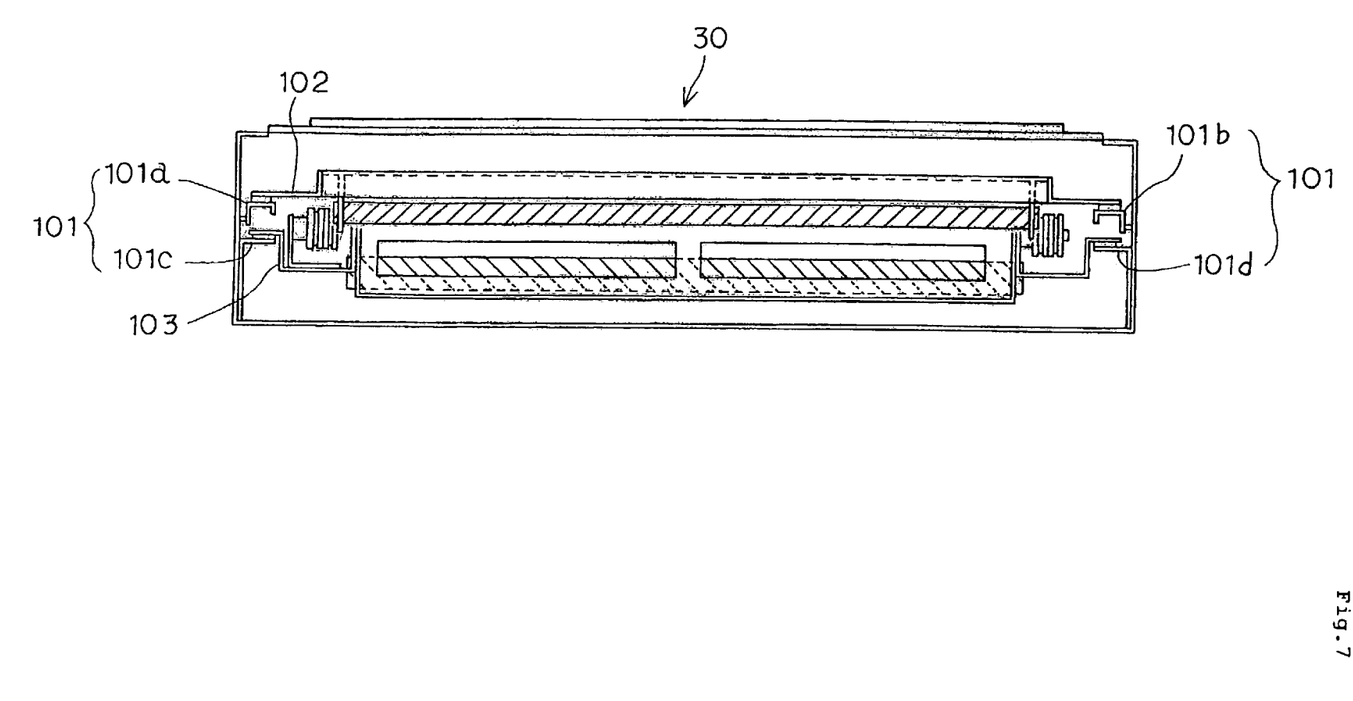
FIG. 7 is a vertical cross-sectional view of a driving mechanism of the optical reading apparatus in FIG. 6.

As the first carriage 102 and the second carriage 103 are both fixed to the wire 120 at their parts, subscanning is performed by driving by the wire. The first carriage 102 is directly fixed to the wire. The second carriage 103 is driven by the wire over a second carriage pulley 122 on the carriage. Accordingly, the second carriage 103, subscanmoved in accordance with the movement of a shaft of the second carriage pulley 122 on the principle of draw well, moves at a speed ½ of that of the first carriage 102. The one end of the wire is fixed to a part of the side plate of the chasses 100, and the other end, fixed to a drive pulley 123.

The drive motor 110 performs acceleration control in the progress going from a stoppage state to a reading speed. Accordingly, as acceleration must be started from a position prior to a position under the placement guide as a reading start position by an acceleration area, the relation between the position under the white plate 130 as a stop position and the reading start position is determined by this condition.

As described above, the CCD 105 performs image acquisition by one line. For this purpose, predetermined relation is required between the drive motor 110 and the scan timing of the CCD 105, however, basically, an image is obtained by scanning light of the image obtained by the first carriage 102 and the second carriage 103 respectively moving at a constant speed, by the CCD 105, at a constant speed. Accordingly, a stepping motor is used as the drive motor 110 since it easily attains a constant speed, however, it is well known by those skilled in the art that a DC motor feedback controlled by using an encoder may be used, or other various methods may be used.

When the subscanning has been completed to the final reading position of the original document and image acquisition by the CCD 105 has been completed, the motor 110 performs deceleration, then performs high-speed reverse rotation to return the first carriage 102 and the second carriage 103 in the HP direction. Then the motor stops the deceleration in accordance with change in signal from the HP sensor 207, and performs low-speed forward rotation for positioning. The sequence of image acquisition from one page of the original document is as described above.

Figure 9:
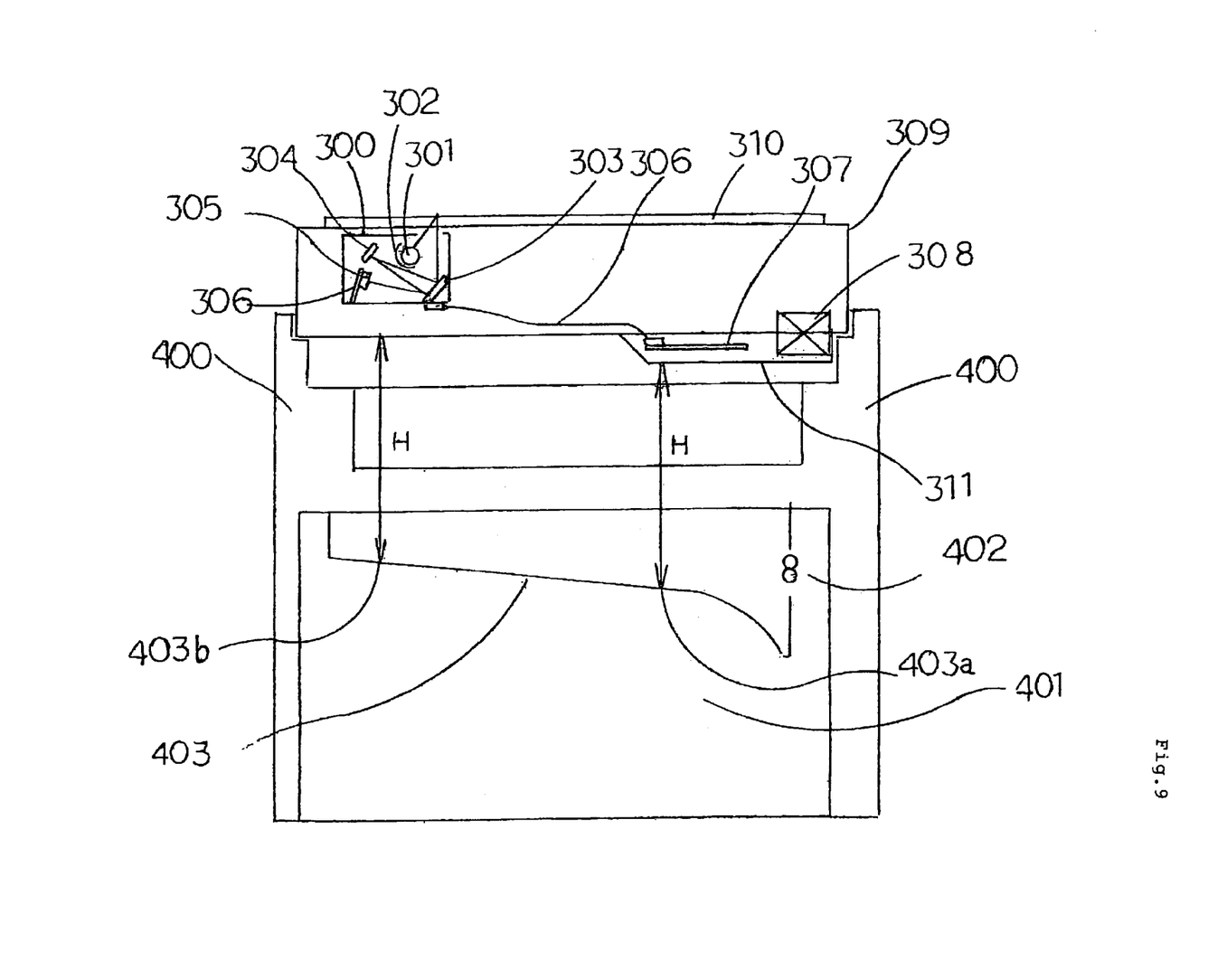
FIG. 9 is a schematic cross sectional view of the internal structure of integrated carriage type optical reading apparatus.

FIG. 9 illustrates the internal structure of integrated carriage type scanner. As shown in this figure, in the present apparatus, in the cabinet, a control circuit board 307 is positioned lower than running movement space for a carriage 300.

In FIG. 9, platen glass 310 on which an original document is placed is provided on a chassis 309. The carriage 300 which scans the platen glass 310 to obtain an image on the original document includes a light source 301 which irradiates the original document, a reflection plate 302 which performs light quantity correction of the light source, mirrors 303 and 304 which change the optical path of light from the original document and ensure an optical path length, and a CCD board 306 carrying a CCD 305 which photoelectric converts the light from the mirror 304.

A control circuit board 307 which processes the image signal from the carriage 300 and a power source 308 which supplies the entire power are placed in a sink portion 311 formed in the bottom surface of the chassis 309. In this arrangement, as the height of these parts is lowered, the platen glass surface can be set in the lowest position while minimizing the projection area of the scanner even in subscan movement of the carriage 300.

Note that the lower part of the scanner is supported by a frame 400, and a height H from a tray upper surface 403b in an end position of the tray 403 of the printer 401 to the bottom surface of the chassis is approximately equal to a height H between a tray upper surface 403a around a discharge roller 402 and the sink portion 311.

Figure 10:
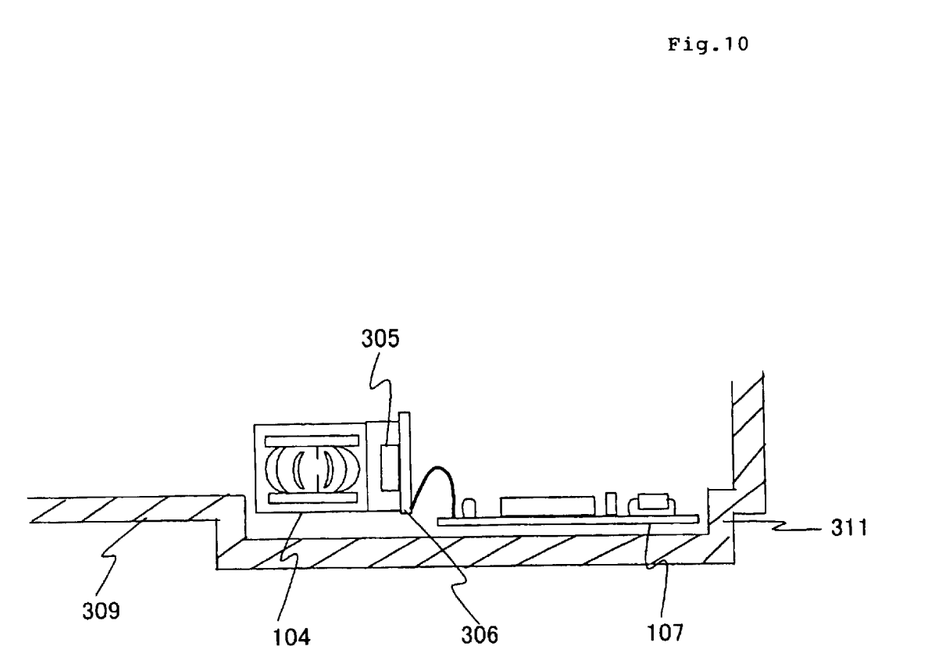
FIG. 10 illustrates a first example of the board arrangement of image sensor and control circuit board in a cabinet of the optical reading apparatus.

FIG. 10 illustrates a first example of the board arrangement of image sensor and control circuit board in a cabinet of the optical reading apparatus. In FIG. 10, the CCD board 306 carrying the light gathering lens 104 and an image sensor 305 for photoelectric conversion is placed, with a control circuit board 107 connected to the CCD board for electric signal processing, in the sink portion 311 formed in the bottom surface of the chassis 309, such that the space for subscan movement of the carriage 300 is ensured above them.

Figure 11:
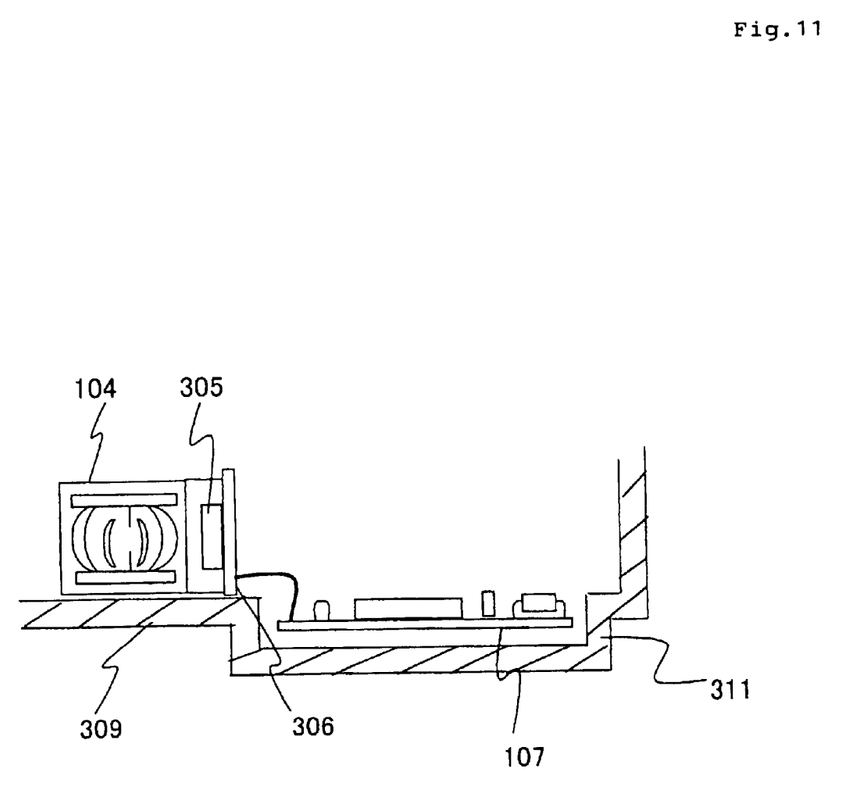
FIG. 11 illustrates a second example of the board arrangement of image sensor and control circuit board in the cabinet of the optical reading apparatus.

FIG. 11 illustrates a second example of the board arrangement of image sensor and control circuit board of the optical reading apparatus. In this example, the control circuit board 107 for electric signal processing is placed in the sink portion 311 formed in the bottom surface of the chassis 309 such that the CCD board 306 carrying the light gathering lens 104 and the image sensor 305 for photoelectric conversion is provided in contact with the bottom surface of the chassis. Thus the area of the platen glass is set in the lowest position while the projection area in the cabinet is minimized.

(8) Downsizing

Figure 8:
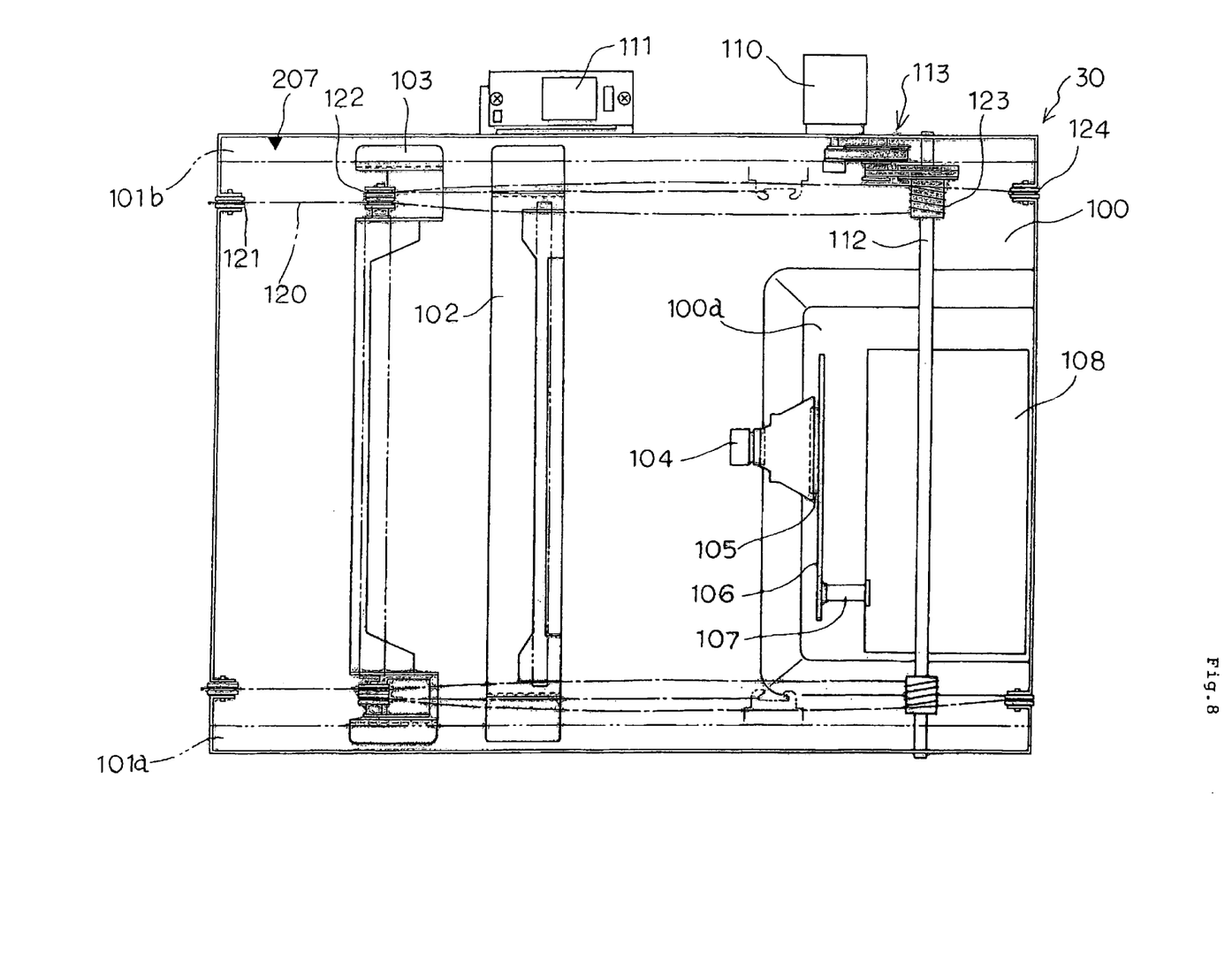
FIG. 8 is a top plan view of the optical reading apparatus in FIG. 6.

In the present invention, various measures are taken to downsize the entire shape of the apparatus. First, turn pulleys 124 and 121 are provided with notches in side surfaces of the chassis 100 for exhibiting parts of the pulleys. By this arrangement, the length of the chassis 100 in the subscanning direction is slightly shortened.

Secondly, the drive motor 110 is positioned around the drive shaft 112 and opposite to the turn pulley 124 with the drive shaft 112 therebetween such that the capacity of transmission mechanism 113 is not greater than the length of the chassis 100 in the subscanning direction. Further, as the drive motor 110 and the drive shaft 112 are provided in positions where the second carriage 103 does not move, the thickness in the height direction of the scanner 30 by hindrance by the drive shaft 112 and the transmission mechanism 113 is avoided.

Thirdly, the sink portion 100a is formed in the bottom surface of the chassis 100 by sheet-metal drawing. The lens 104, the CCD board 106 and the control board 108 are placed by effectively utilizing the sink portion 100a of the chassis 100.

In this manner, in the present embodiment, the control board is placed in the sink portion 100a of the chassis 100, however, the constituent parts such as the power source device and the driving mechanism and modules may be placed there.

(9) Entire Construction

In case of scanner for desktop use, the height from the floor to the original document surface is increased by the sink portion 100a, however, in a scanner placed on a printer as in the present embodiment, the original document surface can be remarkably lowered without any inconvenience for an operator by utilizing space where the printer tray 61 is withdrawn downward in a position where a printed sheet is discharged by the discharge roller 55 of the printer 31. This is naturally preferable in consideration of matching the apparatus to heights of Japanese and women. Further, as tall parts are placed in the sink portion, the position of shielding plate 125 covering them can be lowered, thereby the position of the center of gravity can be lowered and the position of the center of gravity viewed from the upper surface can be offset toward the struts 47d and 47c.

There are no strut in a position left and front of the struts 47d and 47b, on the upper part of the printer 31, such that a print output discharged by the discharge roller 55 can be easily picked up. To avoid distortion in the bottom surface of the chassis 100 of the scanner 30 as much as possible, the center of gravity of the scanner 30 is offset toward the struts 47c and 47d. Further, for the same reason, the drive motor 110 is provided in a far and back position from the operator, thereby the struts 47b and 47c are effectively utilized. In addition, hinge insertion holes 46a are provided such that the hinges 34 for open/close supporting the ADF 33 directly apply the load of the ADF 33 not on the scanner 31 but on the struts 47b and 47c. Thus, upon opening of the ADF 33 when an opening direction is the back side and the center of gravity is especially high, the ADF is stably supported by the struts 47b and 47c.

(10) Operability

As an entire concept, the operator places an original document with his/her right hand on the ADF 33, and picks up a print output on the printer tray 61 with his/her left hand. Further, when the operator places the original document on the book platen glass 41, as the operator uses his/her right hand, the operator performs positioning by applying force on the original document in a leftward direction.

Accordingly, the placement reference of the book platen glass 41 is on the left of the operator. That is, the reference for thrusting the original document is made by a member fixed on the boarder between the book platen glass 41 and the ADF platen glass 40. The reference member is provided as a part of a scanner cover mold omitted from illustration.

Further, as a measurement in case of placement of the original document in a high position, the book platen glass 41 is positioned in front of the operator as much as possible. As described above, the drive motor 110 and the transmission mechanism 113 are provided on the back side, the carriage is positioned on the front side. Further, the hinges 34 for open/close supporting the ADF 33 are set such that the ADF 33 is opened on the back side, and the hinges 34 and the book platen glass 41 are provided away from each other to a maximum. This is also a measure to prevent transfer of oil fouling of the hinge 34 using grease to the original document.

What is claimed is:

1. An image forming apparatus carrying an optical reading apparatus thereon, wherein said optical reading apparatus comprises:

platen glass defined with one end and an other end, on an upper surface on which an original document is placed;

an optical reading unit that scans between said both ends on a lower surface of said platen glass, for obtaining image data by irradiating an original document surface with light through said platen glass;

a control circuit board connected to said optical reading unit, for processing an electric signal; and a housing having a side on the side of said other end thicker than a side on the side of said one end, wherein said image forming apparatus comprises a cabinet positioned under said housing of said optical reading apparatus, said cabinet comprising:

sheet discharge means for discharging an image formation sheet from under said thicker side of said housing of said optical reading apparatus; and a discharge tray, disposed at and covering an upper portion of said cabinet under said housing of said optical reading unit, on which the image formation sheet discharged from said sheet discharge means is received and stacked.

2. The image forming apparatus according to claim 1, wherein said control circuit board is provided in a position lower than running movement space of said optical reading unit.

3. An image forming apparatus carrying an optical reading apparatus thereon, wherein said optical reading apparatus comprises:

platen glass defined with one end and an other end, on an upper surface on which an original document is placed;

first carriage means having light source that scans between said both ends on a lower surface of said platen glass, for irradiating an original document surface with light through said platen glass and first reflection means for reflecting reflection light from said original document surface in a direction of said one end of said platen glass;

second carriage means having second reflection means and third reflection means that scans for reflecting said reflection light from said first carriage means in a direction of said other end of platen glass;

a lens receiving reflection light of said original from said second carriage means and for forming an optical image of said original document;

photoelectric conversion means for receiving said optical image formed by said lens and for converting said optical image into electric signals;

a control circuit board connected to said photoelectric conversion means, for processing said electric signals; and a housing having a side on the side of said other end is thicker than a side on the side of said one end, wherein said image forming apparatus comprises a cabinet positioned under said housing of said optical reading apparatus, said cabinet comprising:

sheet discharge means for discharging an image formation sheet from under said thicker side of said housing of said optical reading apparatus; and a discharge tray, disposed at and covering an upper portion of said cabinet under said housing of said optical reading apparatus, on which the image formation sheet discharged from said sheet discharge means is received and stacked.

4. The image forming apparatus according to claim 3, wherein said control circuit board is provided at an equal height of or at a position lower than said photoelectric conversion means.

5. The image forming apparatus according to claim 1 or 3, wherein said optical reading apparatus further comprising shield means, surrounding said photoelectric conversion means and said control circuit board, for preventing entrance of leakage light inside and outside said apparatus and electric noise and preventing electromagnetic wave interference including diffusion of radiation noise.

6. The image forming apparatus according to claim 1 or 3, wherein in said optical reading apparatus, drive mechanism means including a drive motor is provided on said other end side rather than said center of said platen glass on a back side opposite to an operation front side of said apparatus.

7. The image forming apparatus according to claim 6, wherein said platen glass in said housing means of said optical reading apparatus is moved to the operation front side of said apparatus.

8. The image forming apparatus according to claim 7, wherein said image forming apparatus has an automatic document feeding device on said optical reading apparatus, and wherein said automatic document feeding device is hinged, so as to open and close said platen glass surface, on a back peripheral side opposite to the operation front side of said optical reading apparatus with respect to said cabinet.

9. The image forming apparatus according to claim 8, wherein image data of said original document is read from said one end side toward said other end side of said platen glass.

10. The image forming apparatus according to claim 1, wherein said control circuit board is for processing said image data transmitted from said optical reading apparatus.

11. The image forming apparatus according to claim 3, wherein said control circuit board is for processing said electric signals transmitted from said photoelectric conversion means.

12. The image forming apparatus according to claims 1 or 3, wherein a part that is included in said optical reading apparatus is placed inside said thicker side bottom of said housing of optical reading apparatus.

13. The image forming apparatus according to claims 1 or 3, wherein said housing of optical reading apparatus has a sink portion formed in said thicker side bottom of said housing and a part that is included in said optical reading apparatus is placed in said sink portion.

* * * * *